No. 631,416. Patented Aug. 22, 1899.
W. T. M. BRUNNEMER.
SPRING LIFTING DEVICE FOR AGRICULTURAL IMPLEMENTS.
(Application filed Nov. 10, 1898.)
(No Model.)
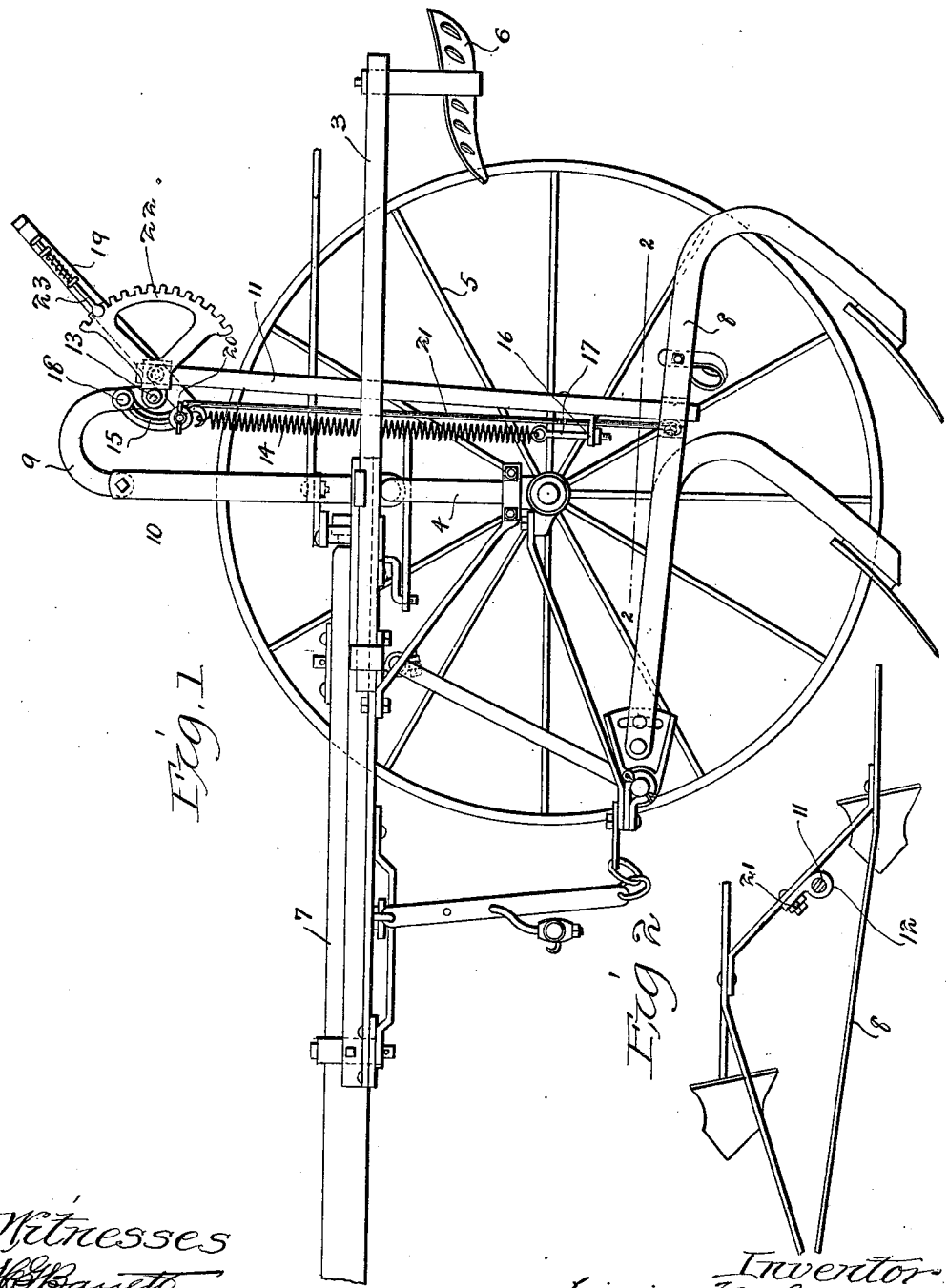
Witnesses
H. G. Barrett
Wm. M. Rheem
Inventor
William T. M. Brunnemer,
by Bond, Adams, Pickard & Jackson
Attys.

UNITED STATES PATENT OFFICE.

WILLIAM T. M. BRUNNEMER, OF BRADLEY, ILLINOIS, ASSIGNOR TO THE DAVID BRADLEY MANUFACTURING COMPANY, OF CHICAGO, ILLINOIS.

SPRING LIFTING DEVICE FOR AGRICULTURAL IMPLEMENTS.

SPECIFICATION forming part of Letters Patent No. 631,416, dated August 22, 1899.

Application filed November 10, 1898. Serial No. 696,037. (No model.)

*To all whom it may concern:*

Be it known that I, WILLIAM T. M. BRUNNEMER, a citizen of the United States, residing at Bradley, in the county of Kankakee and State of Illinois, have invented certain new and useful Improvements in Spring Lifting Devices for Agricultural Implements, of which the following is a specification, reference being had to the accompanying drawings.

My invention relates to agricultural implements, and has more particularly to do with the spring lifting devices used in such implements for lifting the gangs of furrow-openers.

The object of my invention is to provide certain improvements in cultivators of the type illustrated in my pending application, filed April 18, 1898, Serial No. 678,048, in which the furrow-opener gangs are connected with the lifting devices by means of rigid upright rods or bars, one for each cultivator-gang. In the type of machine referred to it is desirable that the upright bar be adjustably connected, so that the normal running depth of the furrow-openers may be adjusted without varying the action of the spring lifting devices, and heretofore it has been attempted to secure this result by providing adjusting devices at the upper end of the bars, so as to adjustably connect the bars with the spring lifting devices. The adjustment of the connection between the lifting devices and the bar is objectionable and inefficient, however, in constructions in which the spring is connected to the bar, as shown in my former application, above referred to, as unless the connection between the lower end of the spring and the bar is also adjusted so as to correspond with the adjustment of the upper end of the bar the action of the spring is varied. My present invention provides certain improvements by which the gangs may be adjusted with reference to the bar without affecting the action of the spring lifting devices, thereby providing for the proper adjustment of the normal running depth of the furrow-openers; and it consists in adjustably connecting the furrow-opener gangs or the carrying devices to which they are secured with the lower portions of the bars, so that said gangs may be adjusted vertically along the bars, and providing lever mechanism for effecting the adjustment of the gangs upon the bars.

It further consists in an improved arrangement of spring lifting devices in connection with the gangs adjustable upon the bars referred to.

It should be understood, however, that while my improvements are especially adapted for use in cultivators in which the lifting-springs are connected with the bars they may also be applied to implements having different forms of lifting devices—as, for example, where the lifting-springs act directly upon rocking frames or arms connected by links to the bar—and I therefore do not restrict myself to the use of my improvements upon machines having lifting devices constructed as shown in my former application, although I have so illustrated them in the accompanying drawings.

In the accompanying drawings, Figure 1 is a side elevation, and Fig. 2 is a section on line 2 2 of Fig. 1.

3 indicates the frame of the cultivator; 4, an arched axle; 5, one of the wheels; 6, the seat; 7, the tongue, and 8 one of the cultivator-gangs. The gang 8 may be connected to the tongue or to the frame 3 in any suitable way.

The lifting devices, as herein shown, consist of a rocking lever 9, pivoted upon a suitable support 10, carried by the frame of the machine and connected at its opposite end to the upper end of a rod or bar 11, which rises from the gang 8 and moves in a sleeve 12, carried thereby. The upper end of the bar 11 is secured to the lever 9 upon a pivot 13, as shown in Fig. 1.

14 indicates the lifting-spring, which is connected at its upper end to the lever 9 through the instrumentality of a link 15, pivoted to said lever near the pivot 13. The lower end of the spring 14 is connected to the bar 11 preferably by a bracket 16 and bolt 17, thereby providing an adjustable connection. The arrangement is such that when the parts are in the position shown in Fig. 1 the spring 14 is at its greatest tension and exerts the greatest lifting force, although inasmuch as the pivot 18 of the link 15 is substantially in line with the pivot 13 and the bolt 17 the action of the spring is neutralized. By rocking the lever 9 slightly, ordinarily effected by lifting the bar 11 by hand or foot power, the pivot 13 is thrown backward and upward, bringing the spring 14 into action and effecting the lifting of the gangs. This construction is shown and described in my former application, Serial No. 678,048.

For the purpose of adjusting the furrow-openers independently of the lifting devices a lever 19 is provided, which is pivoted, preferably, upon the upper end of the bar 11 and has a forwardly-projecting arm 20, connected by a connecting-rod 21 to the gang 8, as shown in Fig. 2. By moving the lever 19 downward the inner end 20 thereof is thrown upward, raising the gang upon the bar 11, which remains stationary, the spring 14 being consequently unaffected. A locking-segment 22 and dog 23 are provided, so that the lever 19 may be locked in any desired position.

That which I claim as my invention, and desire to secure by Letters Patent, is—

1. The combination with a machine-frame, and a lifting device, of a bar connected at its upper end to the lifting device, a furrow-opener-carrying device adjustable upon the lower portion of said bar, and lever mechanism connected with said furrow-opener-carrying device for adjusting it upon the bar, substantially as described.

2. The combination with a machine-frame, and a spring lifting device carried thereby, of a furrow-opener-carrying device, a bar upon the lower end of which the furrow-opener-carrying device is adjustable, said bar being connected at its upper end to the lifting device, an adjusting-lever, a connecting-rod connecting said lever and the furrow-opener-carrying device and a locking device for said lever, substantially as described.

3. The combination with a machine-frame, of a furrow-opener-carrying device, a bar extending upwardly therefrom and adjustably connected therewith, a rocking lifting-lever pivoted upon the machine-frame and connected to the upper end of said bar, and a lifting-spring connected to said lever and to said bar, substantially as described.

4. The combination with a machine-frame, of a furrow-opener-carrying device, a bar extending upwardly therefrom and adjustably connected therewith, a rocking lifting-lever pivoted upon the machine-frame and connected to the upper end of said bar, a lifting-spring connected to said lever and to said bar, and a lever for adjusting the position of said furrow-opener-carrying device upon the bar, substantially as described.

WILLIAM T. M. BRUNNEMER.

Witnesses:
F. W. BICKNELL,
GEO. S. MORGAN, Jr.